APPARATUS TO DEPOSIT A FERROMAGNETIC FILM
ON A CONDUCTIVE WIRE

Filed May 21, 1964

United States Patent Office 3,441,494

Patented Apr. 29, 1969

3,441,494
APPARATUS TO DEPOSIT A FERROMAGNETIC FILM ON A CONDUCTIVE WIRE

Shintaro Oshima, Musashino-shi, Kakuo Futami, Mitaka-shi, Takasuke Fukui, Tokyo-to, Tetsusaburo Kamibaya-shi, Shinza-machi, Kitaadachi-gun, Saitama-ken, and Yoshihisa Komazawa, Tokyo-to, Japan, assignors to Kokusai Denshin Denwa Kabushiki Kaisha, Tokyo-to, Japan, a joint-stock company of Japan Filed May 21, 1964, Ser. No. 369,176
Claims priority, application Japan, May 25, 1963, 38/26,376
Int. Cl. C23b 5/68, 5/58, 5/50
U.S. Cl. 204—228 1 Claim This invention relates to conductive wire with ferromagnetic film deposited thereon (magnetic wire) and its production. More particularly, the invention concerns conductive wire having deposited thereon a ferromagnetic film, directly, or over another conductive layer inserted therebetween, and having a uniform easy axis in a direction such as the circumferential or longitudinal direction. The invention further concerns a method and apparatus for production of such wire.

Figure 1A:
Figure 1B:
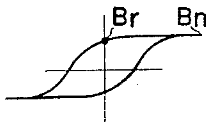
Figure 1C:
Figure 1D:
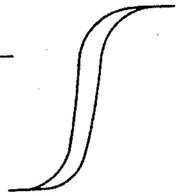

A wire parametron and a wire memory using memory wire have been recently developed. Said wire parametron element is formed into a bridge circuit including four arms of a magnetic wire; and said wire memory is composed of said memory wires and conductive wires arranged in a mutually intersecting state, whereby binary information is stored in and read out from the wire memory by energizing these wires. Accordingly, said memory wire becomes an important material. The memory wire is generally produced by electrically or evaporatively depositing a ferromagnetic film on a conductive base wire. With respect to conventional memory wire manufactured by simply depositing the ferromagnetic film on the conductive wire as mentioned above, however, the easy axis of the film is generally established in the longitudinal direction of the memory wire. The reason thereof is that, since the memory wire is produced by drawing the conductive wire by means of dies for drawing, the easy axis of a ferromagnetic film deposited on the drawn wire is liable to be established in the direction of "micro-cracks" caused in said drawing process. Accordingly, it is still considerably difficult to obtain a regular characteristic of the easy axis by the deposition of the film, under a steady state magnetic field in the circumferential direction of the wire.

An object of the present invention is to provide memory wires suitable for use in electronic devices, such as wire parametrons and wire memory devices.

Another object of the invention is to provide memory wires easily variable in the direction of the magnetization thereof by small magnetic field intensity.

Still another object of this invention is to provide production methods for memory wires each having uniform easy axis established in the predetermined direction.

A further object of this invention is to provide apparatus for producing memory wires each having uniform easy axis established in the predetermined direction.

According to the present invention there is provided a conductive wire with ferromagnetic film deposited thereon (magnetic wire), comprising a base wire which has a uniform diameter and extremely smooth surface with mono-directional micro-cracks of considerable smaller dimensions than the thickness of the film to be deposited and a ferromagnetic film deposited on the base wire and having a uniform easy axis established in the direction of said micro-cracks. Said magnetic wire is easily produced by the producing method and apparatus according to this invention to be described in detail hereinafter.

Figure 4:
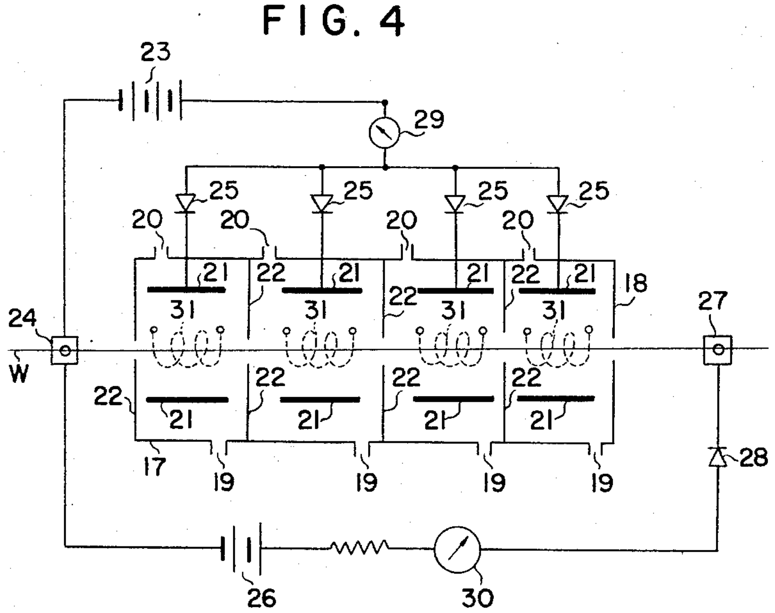
Figure 5A:
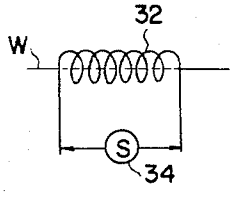
Figure 2:
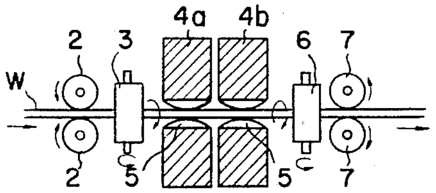
Figure 3A:
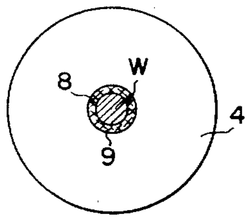

The manner in which the foregoing as well as other objects and advantages may best be achieved will be understod more fully from a consideration of the following description of the principle and embodiments of the present invention, taken in connection with the accompanying drawings, in which the same or equivalent members are designated by the same characters, and in which:

FIGS. 1(*a*), 1(*b*), 1(*c*) and 1(*d*) are diagrams illustrating magnetic hysteresis characteristics of conventional magnetic wires;

FIG. 2 shows a sectional view of a polishing process according to this invention;

FIGS. 3(A), (B), (C), (D), (E) and (F) show, respectively, views of a polisher or portion of a polisher to be used in this invention;

FIG. 4 shows a general view for describing a depositing system according to this invention; and FIGS. 5(A) and (B) show, respectively, general connection and composition diagrams of heat means to be employed in a process of this invention.

FIGS. 1(*a*), (*b*), (*c*) and (*d*) show hysteresis characteristic curves varied in accordance with increase of thickness of the magnetic film, in the case in which the magnetic film is deposited on a conductive base wire under a magnetic field applied in the circumferential direction of the base wire in order to establish the easy axis in the circumferential direction, said hysteresis characteristic curves corresponding to those viewed in the longitudinal direction of the base wire. The thicknesses of the film with respect to these characteristic curves are, respectively, (a) 0.23 micron, (b) 0.42 micron, (c) 0.66 micron (d) 1.30 micron. In consideration of the condition in which said curves show the characteristic curves perpendicular to the easy axis of the magnetic film, it is understood that the easy axis is established in the circumferential direction acquired. In the case of a thinner thickness than approximately 0.4 to 0.6 micron, the magnitude of the coercive force Hc increases, and especially, the hysteresis characteristic curve of FIG. 1(*a*) has a complicated step-shape because the thinner the thickness of the magnetic film is, the more obviously does the effect of the surface condition of the base wire appear in the characteristic of said magnetic film. More particularly, occlusion of gas in the surface, irregular arrangement of crystallization of said magnetic film caused by "micro-cracks" which are produced by the dies for drawing the base wire and are arranged in the longitudinal direction, etc., may be the reasons why the easy axis is liable to be established in the longitudinal direction, and the coercive force of the magnetic film increases in accordance with decrease of the thickness of the film.

As a result of the consideration and observation mentioned above, the depth of said "micro cracks" remaining on the surface of the base wire is generally of the order of several thousand A. As mentioned above, it is generally understood that depreciation of uniform magnetic characteristics in the case of a thinner magnetic film is due to such "micro cracks" on the base conductive wire. Hence, the principles for reducing such depreciation in the characteristics are as follows:

(1) Keeping the depth of the "micro cracks" to a minimum, and maintaining the "micro cracks" in the mono-direction of the easy axis of the magnetic film to be deposited thereon; and (2) Depositing a non-magnetic conductive layer on said extremely smooth base wire by the principle (1), then depositing thereon a ferromagnetic film so as to establish the easy axis of the film in the mono-direction of the "micro cracks."

The method for realizing the said principles of this invention is described in detail hereinafter with reference to FIG. 2. The base wire *w* is generally produced by drawing, through dies for drawing, a conductive metal into a wire which has a uniform, usable diameter. Spring wire, such as beryllium copper wire or Phosphor bronze wire, is suitable as the base wire for removing undesirable magnetostriction effect of the magnetic film to be deposited there on in the case of its use in magnetic wire devices. Then such a base wire *w* is introduced, through guide rollers 2 and 3, to dies 4*a* and 4*b* to be employed as a polisher. The wire *w* so obtained is further passed through guide rollers 6 and 7. Said guide rollers 2, 3, 6 and 7 guide the wire so as to make it pass through the center holes of dies 4*a* and 4*b*. The material 5 arranged at the center of each die is a hard substance such as tungsten, steel, or diamond. The diameter of the center hole of each die is appropriately caused to fit the diameter of base wire by substantially equalizing the two or by electing the former diameter to be very slightly smaller than the later diameter. In said polishing system, the base wire *w* is polished in the longitudinal or circumferential drection thereof in accordance with non-rotation or rotation of said dies 4*a* and 4*b*. In order to increase the polishing effect of such polishing means, the number of polishers may be increased. In the case in which said dies are vibrated, with actually appropriate frequency such as commercial frequency or higher, in the travelling direction of the base wire, the polishing effects of these polishers increase extremely. Said variation is carried out, for example, by utilizing electromagnetic force or a cam mechanism. When said dies 4*a* and 4*b* are rotated in the directions designated by arrows at a speed much higher than the travelling speed of the base wire *w*, is polished in the circumferential direction thereof.

Other types of polishers, of course, can be employed. The polisher illustrated in FIG. 3(A) comprises a body 5 having a hole 9 and soft material 9 such as a plastic or a fiber which is attached to the hole so as to contact closely the base wire *w* to be passed.

Figure 3B:
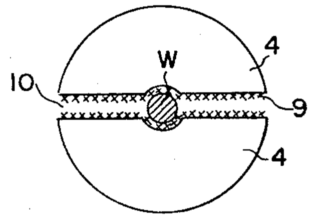
Figure 3C:
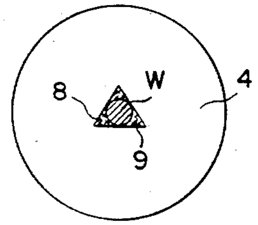
Figure 3D:
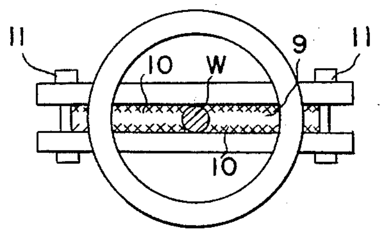

FIG. 3(B) shows a polisher composed of two divided parts 4 leaving therebetween an elongated variable space 10. Since the soft material 9 is attached in the space 10, replacement of the soft material 9 is easily performed. The polishers shown in FIGS. 3(C) and (D) are respectively modifications of the polishers shown in FIGS. 3(A) and (B). Another polisher as shown in FIG. 3(E) comprises a plurality of polishing means 12 such as cylinders, circular disks, or spheres, a circular case 4 for retaining the polishing means, and a holder 13 for holding said polishing means 12.

Figure 3E:
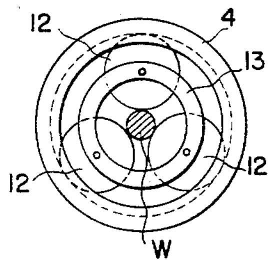
Figure 3F:
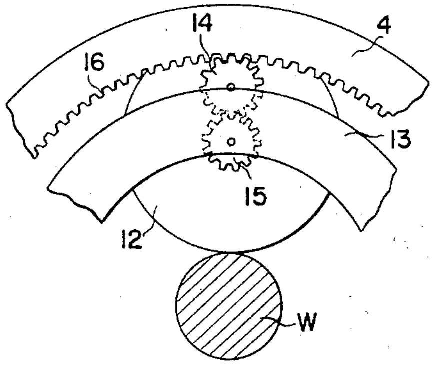

When the holder 13 of FIG. 3(E) is synchronously or independently rotated with respect to the rotation of the circular case, the wire *w* passed between the polishing means is effectively polished. FIG. 3(F) shows a portion of a modification of the polisher shown in FIG. 3(E). In this polisher, a gear 15 fixed to the polishing means 12 is rotated by a gear 14 which is rotated by an internal gear 16 of the case 4.

In order to carry out the polishing process effectively, polishing agents can be employed into all polishers or dies mentioned above. Micro-granular materials, such as red oxide of iron ($Fe_2O_3$), selenium dioxide ($SeO_3$), zirconium oxide ($ZrO_2$) and chromic oxide ($Cr_2O_3$), are suitable for said polishing agents; in such a case, it is desirable to elongate the length of polishing means 12 in the travelling direction of the wire *w*. In practice, the use of different types of polishers or/and the use of different kinds of polishing agents is/are preferable for obtaining very smooth surface condition of the conductive wire *w*. When the particle sizes of said polishing agents are made smaller step by step with respect to successively arranged dies or polishers, the surface of the conductive base wire is gradually smoothed. In the above mentioned polishing process, the depth of said "micro-cracks" becomes, in practice, smaller than approximately 100 A. However, "micro-cracks" remain in the mono-direction such as the longitudinal or circumferential direction of the base wire.

Said base wire *w*, smoothed as above mentioned, is then coated with ferromagnetic film by electrical plating, evaporating deposition, or some other suitable method. In order to obtain uniform characteristics of the deposited film, obstruction materials attached to the surface, such as said polishing agents, oil, or oxides of the base wire, are first removed. This is a preceding treatment, in which the following treatments are optionally carried out.

(1) Slight annealing for curing winding set of the base wire *w*.

(2) Passing through a fifty percent (50%) solution of hydrochloric acid.

(3) Reduction with ammonia water.

(4) Reduction in a current of a reduction gas mixture of isopropyl-alcohol and nitrogen at a temperature of several hundreds of degrees centigrade.

(5) Washing with pure water.

The clean base wire *w* obtained by the preceding treatment is then coated with a deposit of a ferromagnetic film, such as permalloy. The following description mainly relates to such deposition by electroplating. A suitable composition of the electrolyte for such electroplating is as follows:

| | Gramme/litre |
|---|---|
| Nickel sulfate ($NiSO_4 \cdot 6H_2O$) | 20 |
| Nickel chlorite ($NiCl_2 \cdot 6H_2O$) | 20 |
| Ferrous sulfate ($FeSO_4 \cdot 7H_2O$) | 10.4 |
| Boric acid ($H_3BO_3$) | 80 |

Other additives are a small quantity of saccharin ($C_7H_5SO_4$) and lauric acid natrium $$(CH_3(CH_2)_{11}OSO_3N_a)$$

The first three components are for supplying ions to be deposited. Said composition is selected so as to obtain minimum magnetostriction condition of the film to be deposited. Boric acid is employed as a buffer for pH. Saccharin has the effect of decreasing occlusion gas in the deposited film thereby producing smaller magnitude of the coercive force. Lauric acid natrium is an activator for the cathode. The current for electro-plating is approximately 10 to 40 ampere/square decimeter. The temperature of the electrolyte is approximately 50 degrees centigrade. The anode is permalloy composed of 80 percent of nickel and 20 percent of iron. The travelling speed of the base wire *w* is in accordance with the thickness of the film to be deposited, for example, a travelling speed of 2.64 centimeter/second produces a thickness of 1.1 micron of the film on the base wire *w*.

In said electroplating process, the easy axis of the magnetic film deposited is liable to be established in the direction of the applied magnetic field. Accordingly, when a steady-state current flows through the base wire *w*, a magnetic film having a uniform, circumferential easy axis is obtained because the current generates a magnetic field directed in the circumferential direction of the base wire *w*. On the other hand, when a steady-state current flows through a coil through which said conductive wire is travelling, a magnetic film having a uniform, longitudinal easy axis is obtained.

In this electroplating process, the electroplating current is passed through the base wire *w*, thereby generating an electric potential in the base wire *w* in the electrolyte. This difference has the undesirable effect of slightly carrying out electrolysis on the deposited film, thereby causing non-uniform characteristic of the deposited film. The method and apparatus according to this invention for eliminating such undesirable effect is described hereinafter. FIG. 4 shows a general view of said method and apparatus. Said electrolyte 18 is accommodated in a case 17 composed of an insulation material such as glass or a plastic, etc., and, moreover, is caused to flow slowly in circulation through from inlets 19 to outlets 20 and through outside circulation means. The composition of the anode means and its isolation means is the unique feature of this method and apparatus. More specifically, the anode means is composed of a plurality of anodes 21 arranged side by side in the travelling direction of the base wire *w*, and said isolation means is composed of at least one insulator 22, such as glass or a plastic, etc. A current source 23 supplies a plating current through a terminal 24 and said anodes 21. The undesirable difference potential of this apparatus however, is divided into several portions because of this arrangement; therefore, such effect of electrolysis is greatly decreased. Diodes 25 are unidirectional means for isolation between said anodes 21. A current source 26 supplies through terminals 24 and 27 a current flowing into the base wire *w* to generate said circumferential magnetic field. Diodes 25 and 28 protect direct coupling between sources 23 and 26. Current indicators 29 and 30 respectively show currents flowing therethrough. Coils 31 shown by dotted lines are employed for applying a longitudinal magnetic field to the base wire *w*.

Figure 5B:
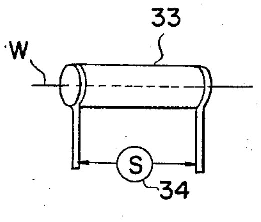

The magnetic film coated wire (magnetic wire) produced by the electro-plating process has considerable uniform characteristics. A heating process, however, can improve the uniformity of the characteristic of the magnetic wire. The heating process of this invention is carried out in a very short, necessary time under the application of a magnetic field applied in the same direction as the aforesaid magnetic field. FIG. 5A shows a coil heater 32, such as tungsten wire or nickel-chromium wire, for heating the magnetic wire passing therethrough and for applying a longitudinal magnetic field to the magnetic wire. A source 34 supplies a current to the coil heater 32. A pipe heater 33 composed of, for example, stainless steel, is employed only for heating the magnetic wire passing therethrough by means of a current supplied from a current source 34 as shown in FIG. 5. The magnetic field in this case, however, is applied by a current flowing through the magnetic field. This heating process of this invention is carried out at approximately 1.5 centimeter/second at a heat temperature of approximately 500 to 700 degrees centigrade. Of course, this heating process is carried out in the said reduction gas mixture to prevent oxidation of the surface of the magnetic wire.

The ferromagnetic film can be deposited by another technique such as evaporative deposition.

In this paragraph, a further production method for magnetic wires according to this invention is described. Since the base wire *w* is generally composed of a spring wire having a slightly larger electrical resistance, when a conductive layer having low electrical resistance is deposited on the base wire *w*, the conductivity of the base wire *w*, that is, of the magnetic wire, is considerably improved. For this purpose, a conductive layer, such as a copper layer or a silver layer can be deposited on the base wire; therefore, the ferromagnetic film is deposited on the conductive layer deposited on the base wire *w*. One example of the electrolyte of this case is the following composition: (1) copper sulfate ($CuSO_4$) . . . 220 gramme/litre, (2) concentrated sulfuric acid ($H_2SO_4$) . . . 36 cc./litre, and a little additional grossing material, such as gelatin, 0.6 gramme/litre. The electroplating current is approximately (200 to 400) milliamperes. The arrangement of anodes and insulators shown in FIG. 4 is applicable to the electroplating system in this case. The polishing process in this case can be carried out on the base wire or/and the base wire with the conductive wire deposited thereon.

As mentioned above in detail, the magnetic wire of this invention has extremely uniform magnetic characteristics. Particularly, the easy axis thereof is established in the predetermined mono-direction in a very uniform condition. Accordingly, the magnetic wires according to this invention are highly suitable for electronic devices. Moreover, when a small-diameter tubular wire is employed as the base wire, and other insulated control wires are inserted into the base wire of tubular shape, the magnetic wire of this tubular shaped type can be easily controlled in its magnetic or electric characteristic by other control signals.

While particular embodiments of this invention have been described and shown, it will, of course, be understood that it is not to be limited thereto, since many modifications may be made of this invention; therefore, it is contemplated by the appended claim to cover all such modifications as fall within the true spirit and scope of this invention.

What we claim is:

1. An apparatus for carrying out extremely uniform electroplating of a ferromagnetic film on an electrically conductive wire, comprising receptacle means for accommodating electrolyte containing ions to be electroplated on the wire, means for advancing the wire longitudinally through said electrolyte, anode means comprising a plurality of electrodes arranged side by side along the path of travel of the wire through said electrolyte, said electrodes being substantially isolated from one another, a DC current source means for flowing an electroplating current through said electrolyte between said anode means and the wire, a plurality of diodes each connected between each of the electrodes and said DC current source means and effective to check loop currents flowing through any two of the electrodes, a current source for flowing a current to apply a magnetic field to the wire, and a diode connected between the wire and the last-mentioned current source effective to prevent the two current sources from coupling.

References Cited

UNITED STATES PATENTS

| | | | |
|---|---|---|---|
| 2,165,326 | 7/1939 | Yerger et al. | 204—211 |
| 2,445,675 | 7/1948 | Lang | 204—228 |
| 2,619,454 | 11/1952 | Zapponi | 204—43 |
| 3,189,532 | 6/1965 | Chow et al. | 204—28 |
| 3,284,324 | 11/1966 | Appel et al. | 204—38 |
| 2,695,269 | 11/1954 | DeWitz | 204—206 |
| 2,737,487 | 3/1956 | Rayburn | 204—206 |
| 2,750,658 | 6/1956 | Went | 29—191.2 |
| 2,970,936 | 2/1961 | Richardson | 29—155.5 |
| 3,042,997 | 7/1962 | Anderson | 29—155.5 |
| 3,193,362 | 7/1965 | Hespenheide | 29—191.6 |

FOREIGN PATENTS

| | | |
|---|---|---|
| 926,385 | 5/1963 | Great Britain. |
| 725,186 | 9/1942 | Germany. |

JOHN H. MACK, *Primary Examiner.*

W. VAN SISE, *Assistant Examiner.*

U.S. Cl. X.R.

204—29, 28, 209, 206, 211